United States Patent
Janssen et al.

(10) Patent No.: US 7,796,722 B2
(45) Date of Patent: Sep. 14, 2010

(54) QUANTUM DETECTOR MODULE, QUANTUM DETECTOR, METHOD FOR DETERMINING QUANTUM ABSORPTION EVENTS, COMPUTER PROGRAM PRODUCT AND RADIATION DETECTION DEVICE

(75) Inventors: Silke Janssen, Heroldsbach (DE); Daniel Niederlöhner, Erlangen (DE)

(73) Assignee: Siemens Aktiengesellschaft, Munich (DE)

( * ) Notice: Subject to any disclaimer, the term of this patent is extended or adjusted under 35 U.S.C. 154(b) by 92 days.

(21) Appl. No.: 12/219,205

(22) Filed: Jul. 17, 2008

(65) Prior Publication Data

US 2009/0122956 A1  May 14, 2009

(30) Foreign Application Priority Data

Jul. 18, 2007  (DE) ............... 10 2007 033 462

(51) Int. Cl.
- *H05G 1/60* (2006.01)
- *H05G 1/64* (2006.01)
- *G01N 23/06* (2006.01)

(52) U.S. Cl. .................... 378/19; 378/98.8; 378/51
(58) Field of Classification Search .......... 378/4, 378/19, 15, 51, 98.8
See application file for complete search history.

(56) References Cited

U.S. PATENT DOCUMENTS

| 5,151,588 A | 9/1992 | Kiri et al. |
| 5,166,961 A | 11/1992 | Brunnett |
| 7,212,604 B2 * | 5/2007 | Tkaczyk et ............ 378/19 |
| 2007/0076848 A1 * | 4/2007 | Walter et al. ............ 378/98.8 |

FOREIGN PATENT DOCUMENTS

| DE | 69004404 T2 | 3/1994 |
| DE | 102007027921 A1 | 1/2009 |

OTHER PUBLICATIONS

German Office Action, Jan. 29, 2009.

\* cited by examiner

*Primary Examiner*—Irakli Kiknadze
(74) *Attorney, Agent, or Firm*—Harness, Dickey & Pierce, P.L.C.

(57) ABSTRACT

A quantum detector module for the quantitative and energy-resolved determination of quantum absorption events, a quantum detector, a method for determining quantum absorption events, a computer program product and a radiation detection device are disclosed. In at least one embodiment, the quantum detector module includes a multiplicity of detector pixels. In order to determine the quantum absorption events particularly precisely, in at least one embodiment it is provided that the detector pixels have at least two mutually different pixel apertures.

24 Claims, 4 Drawing Sheets

QUANTUM DETECTOR MODULE, QUANTUM DETECTOR, METHOD FOR DETERMINING QUANTUM ABSORPTION EVENTS, COMPUTER PROGRAM PRODUCT AND RADIATION DETECTION DEVICE

PRIORITY STATEMENT

The present application hereby claims priority under 35 U.S.C. §119 on German patent application number DE 10 2007 033 462.3 filed Jul. 18, 2007, the entire contents of which is hereby incorporated herein by reference.

FIELD

Embodiments of the invention generally relate to a quantum detector module for the quantitative and energy-resolved determination of quantum absorption events, a quantum detector, a method for the quantitative and energy-resolved determination of the quantum absorption events, a computer program product that simulates the method, and/or a radiation detection device.

BACKGROUND

So-called quantum counting detectors are known for the quantitative and energy-resolved determination of quantum absorption events. These detectors can detect quanta of X-ray or gamma radiation incident on the detector in terms of their number and energy. These detectors generally include a converter layer for converting a quantum absorption event that takes place in the converter layer into electrical charges. In this case, the converter layer can be produced e.g. from a semiconductor material. A cover electrode is applied on a first surface of the converter layer and a multiplicity of individual electrodes arranged in matrix-like fashion are applied as counterelectrodes with respect to the cover electrode on a second surface opposite the first surface. The cover electrode and individual electrodes are also known by the designations "rear side contact" and "pixel contact", respectively.

During operation of the detector, a voltage is applied between the cover electrode and the individual electrodes, whereby electric fields form in the converter layer. A detector pixel is formed by each pixel contact and the electric field assigned thereto. Electrical charges generated in the active region of the electric fields of the detector pixels as a result of e.g. one or more quantum absorption events are separated from one another in the converter layer and accelerated—depending on charge type—to the cover electrode or to respective pixel contacts. The charges moved in this way influence currents to the corresponding electrodes. On the basis of these electrical signals it is possible to determine the number of quantum absorption event(s), that is to say the number of absorbed quanta of the X-ray or gamma radiation, and an energy assigned to them. One disadvantage of conventional quantum detector modules is that the number and/or energy cannot be determined with satisfactory accuracy.

SUMMARY

In at least one embodiment of the invention, at least one disadvantage according to the prior art is reduced or even eliminated. The intention is, in at least one embodiment, to specify a quantum detector module which enables a particularly precise quantitative and energy-resolved determination of quantum absorption events. Furthermore, in at least one embodiment the intention is to specify a method which, using the quantum detector module, enables a particularly precise quantitative and energy-resolved determination of quantum absorption events. A further aim of at least one embodiment is to specify a corresponding computer program product, a quantum detector and a radiation detection device.

A first aspect of at least one embodiment of the invention relates to a quantum detector module for the quantitative and energy-resolved determination of quantum absorption events. In this case, a quantitative and energy-resolved determination should be understood to mean that the number of quantum absorption events and an energy assigned to them or an energy range assigned to them are determined.

For the, in particular direct, conversion of the quantum absorption events into electrical charges, the quantum detector module of at least one embodiment comprises a multiplicity of detector pixels having at least two mutually different pixel apertures. In this case, the term "detector pixel" should be understood to mean a smallest detection element formed for the detection of quantum absorption events or a detection unit comprising a plurality of detection elements. The term "pixel aperture" denotes the effectively active detection region of an individual detector pixel. The effectively active detection region correlates with the size, in particular the area, of the detector pixels. The expression "mutually different" used in connection with the term "pixel aperture" is intended to mean that differences over and above statistical, in particular production-dictated, fluctuations exist in the physical properties or detection properties of the detector pixels.

A quantum absorption event should be understood to mean, in the most general sense, any interaction which takes place between a quantum of the X-ray or gamma radiation and the converter layer and as a result of which primary or secondary electrical charges are generated. In the case of a converter layer produced from a semiconductor material, the charges can include electron-hole pairs.

What can be achieved by the embodiment of the quantum detector module according to the invention is that the quantum absorption events can be determined particularly precisely in terms of their number and energy, which will be discussed in greater detail below.

The accuracy that can be achieved sometimes depends on the pixel aperture. Small pixel apertures are suitable particularly for detecting high quantum flow rates of the X-ray or gamma radiation. However, in the case of small pixel apertures it can happen that the electrical charge generated by a quantum absorption event is distributed, e.g. by way of charge diffusion and/or fluorescence photons, among a plurality of detector pixels. Consequently, the electrical signal generated by way of a detector pixel does not represent the total charge, which can lead to an erroneous determination of the energy of the quantum underlying the quantum absorption event.

Large pixel apertures are not as well suited to the quantitative detection of high quantum flow rates. In the case of large pixel apertures and high quantum flow rates, the probability of a plurality of quantum absorption events being superposed is comparatively high. Superpositions impair the linearity between the strength of the electrical signal and the number and energy of the quanta, which leads to a corrupted detection of the quantum absorption events. By contrast, large pixel apertures are particularly well suited to the quantitative and energy-resolved determination of the quantum absorption events at moderate to low quantum flow rates.

By virtue of the fact that both small and large pixel apertures are provided in the quantum detector module according to at least one embodiment of the invention, respectively advantageous properties can be utilized and disadvantageous properties can be suppressed. This can be achieved for example by a suitable combination of the electrical signals from detector pixels having different pixel apertures or respective counter results.

The quantum detector module can have a converter layer for converting the quantum absorption events into electrical charges, in the case of which layer at least one cover electrode is applied on a first surface and a multiplicity of discretely situated individual electrodes are applied on a second surface opposite the first surface. In the case of a single cover electrode, the latter can be formed as a continuous area electrode which at least partly covers the first surface. The individual electrodes each have an electrode area running parallel to the second surface.

By applying an electrical voltage between the cover electrode and the individual electrodes, an electric field is generated in the converter layer, which electric field accelerates the electrical charges, depending on their respective charge type, either to the cover electrode or to the individual electrodes. The cover electrode and the individual electrodes are contact-connected to the converter layer in such a way that the electrical charges can be detected as electrical signals.

According to at least one embodiment of the invention, electrode sizes and/or spacings of the individual electrodes are chosen in such a way that detector pixels having at least two mutually different pixel apertures are formed. In this case, the term electrode size should be understood to mean the size of a respective contact area between the individual electrode and the converter layer; the distance between the midpoints of individual electrodes is also referred to as "pitch". The pixel aperture is dependent, inter alia, both on the electrode size and on the spacing of the individual electrodes. Consequently, the desired pixel apertures can be set by a choice of electrode size and pitch that is advantageous in the respective case.

The detector pixels can have a plurality of mutually different pixel apertures. In particular, it is possible for precisely two mutually different pixel apertures to be provided. The number of detectors pixels having an identical pixel aperture can be adapted to what quantum flow rates and energy ranges are intended to be detected by way of the quantum detector module. To put it another way: the number of detector pixels having an identical pixel aperture can be chosen in a mode dependent on the quantum absorption events to be expected. Furthermore, the number of mutual different pixel apertures can be oriented to what quantum flow rates and energy ranges are intended to be detected by way of the quantum detector module. In other words, the number of mutually different pixel apertures can be chosen in a manner dependent on the quantum absorption events to be expected.

In the case of two different pixel apertures, this means in particular that a ratio of small to large pixel apertures, or vice versa, can be chosen in a manner dependent on the quantum flow rates to be expected. This means in particular that the area density of the individual electrodes can be chosen in a manner dependent on the quantum flow rates to be expected. The area density can be an average or local quantity with respect to the second surface, wherein the area density for individual electrodes having different electrode sizes and/or spacings can be different or identical. By virtue of the orientation of detector pixels or pixel apertures, such as e.g. the number, the electrode size and/or area density of the individual electrodes, to the quantum flow rate to be expected, the quantum detector module can be optimally adapted to the respective requirements, whereby the number and energy of quantum absorption events can be determined particularly precisely.

The detector pixels can be arranged geometrically in essentially any desired manner. In particular, it is possible for the detector pixels to be arranged in parallel rows. In this case, the, in particular central, pixel aperture of a first detector pixel group including at least one row can be larger or smaller than that of an adjacent second detector pixel group comprising at least one row. This includes, in particular, the situation where rows having respective pixel apertures can be periodically repeated. In the case of two different pixel apertures, here rows having a different pixel aperture can succeed one another alternately. Furthermore, the detector pixels of adjacent rows can be arranged congruently with respect to one another or offset with respect to one another, in particular interstitially.

The first and/or second detector pixel group can include a plurality of rows, wherein statements with regard to individual rows analogously hold true for detector pixel groups. The number of rows encompassed by the first and second detector pixel group can correspond to one another or be different. What can be achieved given a suitable geometrical arrangement of the detector pixels is that the quantum detector module is optimally adapted to the respective requirements, whereby the quantum absorption events that are to be expected in each case, in particular locally, can be determined particularly precisely.

One configuration provides for there to be arranged along an edge of the quantum detector module detector pixels whose pixel aperture, or central pixel aperture, is smaller than that of the detector pixels situated more centrally with respect to the edge. In this configuration, by way of the first detector pixel group on the edge side, in addition to the abovementioned advantages, it is possible to achieve a homogenization of the electric field at the edge of the converter layer.

A second aspect of at least one embodiment of the invention relates to a quantum detector, including at least one quantum detector module according to the invention or a configuration thereof. For advantages and advantageous effects of the quantum detector, reference is made to the explanations regarding the quantum detector module according to at least one embodiment of the invention, which hold true in an analogous manner.

In the quantum detector according to the second aspect, the average pixel aperture can increase proceeding from at least one edge of the quantum detector toward the center thereof. This can take account of the fact that an examination object is generally arranged centrally over the quantum detector, as a result of which generally fewer high-energy quanta and overall lower quantum flow rates are to be expected in the central region than in edge regions of the quantum detector.

The quantum detector can furthermore have a scattered radiation collimator disposed upstream of the quantum detector modules in the radiation entrance side. By way of the scattered radiation collimator, in particular by way of collimator lamellae thereof, shading zones representing inactive detection areas are produced in the quantum detector modules. In regions adjacent to the shading zones the detector pixels can have on average smaller pixel apertures than outside said regions. For the case where precisely two different pixel apertures are provided, in each case at least one row having a small pixel aperture can be provided in a manner adjoining a shading zone. The electrical signals of the detector pixels having a small pixel aperture can be used for correcting the electrical signals of the detector pixels having a large pixel aperture, whereby the accuracy of the quantum detector modules can be improved both with regard to the number and with regard to the energy of the quantum absorption events.

A third aspect of at least one embodiment of the invention provides a method for the quantitative and energy-resolved determination of quantum absorption events when using a quantum detector module or quantum detector according to at least one embodiment of the invention. The method comprises:

a) Detection of electrical signals on the basis of the generated electrical charges by way of the detector pixels and b) Determination of quantitative, energy-resolved counter quantities comprising at least one count and one energy value for a quantum absorption event, by combination of at least two electrical signals—detected in step ref. a)—from at least two, preferably adjacent, detector pixels having different pixel apertures.

The advantages of the respective pixel apertures can be utilized advantageously in the method according to at least one embodiment of the invention, such that the accuracy of the determination of the quantum absorption events can be improved.

In the method of at least one embodiment, furthermore, a counter for the energy value can be increased in accordance with the count. In this case, the counter can be used to detect the number of quanta having a predetermined discrete energy or the number of quanta whose energy is situated in a predetermined energy interval.

The combination of the electrical signals of the detector pixels having different pixel apertures can be a weighted summation, for example, The electrical signals can be combined or weighted in a manner dependent on the sensitivity and selectivity of the respective detector pixels. At low quantum flow rates at which the sensitivity of larger pixel apertures is more advantageous by comparison with smaller pixel apertures, the electrical signals of the detector pixels having larger pixel apertures can be weighted to a greater degree, for example. By contrast, with increasing quantum flow rates, the electrical signals of the detector pixels having smaller pixel apertures, which are more selective at high quantum flow rates, can be weighted to an increasingly greater degree. Weighting factors for the weighted summation can be determined on the basis of the electrical signals of the detector pixels, the count and/or the energy value. It is thus possible to improve the dynamic range with regard to the number and energy of detectable quanta.

Other combinations are also considered apart from weighted summation. A correction of the electrical signals by way of a correction function dependent on the electrical signals of the detector pixels shall be mentioned by way of example.

A fourth aspect of at least one embodiment of the invention relates to a computer program product, comprising a program code which, when executed on a computer unit, such as e.g. a computer, effects a method according to the third aspect. A fifth aspect of at least one embodiment of the invention relates to a radiation detection device, in particular an X-ray computer tomograph, comprising a quantum detector according to the second aspect and a computer unit with a program code stored thereon according to the fourth aspect. With regard to advantages and advantageous effects of the computer program product and of the radiation detection device, reference is made to explanations regarding the first to third aspects of at least one embodiment of the invention.

BRIEF DESCRIPTION OF THE DRAWINGS

The invention is explained in more detail below on the basis of example embodiments and figures, in which.

DETAILED DESCRIPTION OF THE EXAMPLE EMBODIMENTS

Various example embodiments will now be described more fully with reference to the accompanying drawings in which only some example embodiments are shown. Specific structural and functional details disclosed herein are merely representative for purposes of describing example embodiments. The present invention, however, may be embodied in many alternate forms and should not be construed as limited to only the example embodiments set forth herein.

Accordingly, while example embodiments of the invention are capable of various modifications and alternative forms, embodiments thereof are shown by way of example in the drawings and will herein be described in detail. It should be understood, however, that there is no intent to limit example embodiments of the present invention to the particular forms disclosed. On the contrary, example embodiments are to cover all modifications, equivalents, and alternatives falling within the scope of the invention. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments of the present invention. As used herein, the term "and/or," includes any and all combinations of one or more of the associated listed items.

It will be understood that when an element is referred to as being "connected," or "coupled," to another element, it can be directly connected or coupled to the other element or intervening elements may be present. In contrast, when an element is referred to as being "directly connected," or "directly coupled," to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting of example embodiments of the invention. As used herein, the singular forms "a," "an," and "the," are intended to include the plural forms as well, unless the context clearly indicates otherwise. As used herein, the terms "and/or" and "at least one of" include any and all combinations of one or more of the associated listed items. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Spatially relative terms, such as "beneath", "below", "lower", "above", "upper", and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, term such as "below" can encompass both an orientation of above and below. The device may be otherwise oriented (rotated 90 degrees or at other orientations) and the spatially relative descriptors used herein are interpreted accordingly.

Although the terms first, second, etc. may be used herein to describe various elements, components, regions, layers and/or sections, it should be understood that these elements, components, regions, layers and/or sections should not be limited by these terms. These terms are used only to distinguish one element, component, region, layer, or section from another region, layer, or section. Thus, a first element, component, region, layer, or section discussed below could be termed a second element, component, region, layer, or section without departing from the teachings of the present invention.

In the figures, identical or functionally identical elements are designated by identical reference symbols throughout. The illustrations in the figures are schematic and not true to scale and scales between the figures can vary. The X-ray computer tomograph and the X-ray detector are discussed below only to the extent necessary for understanding the invention.

Figure 1:
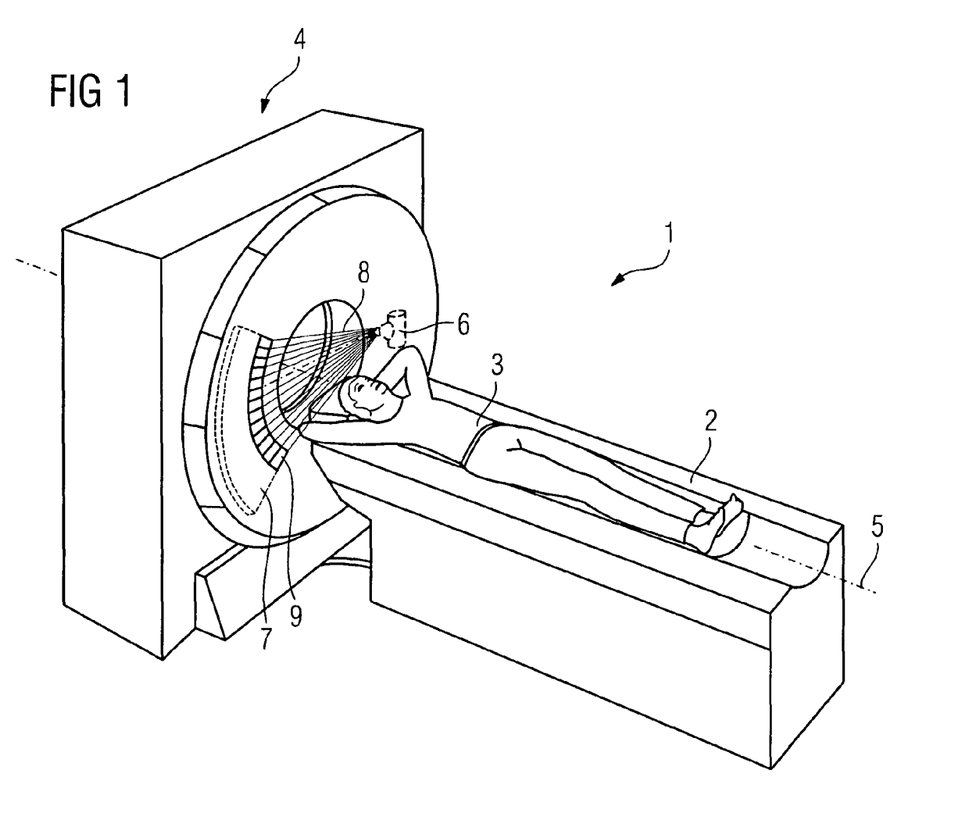
FIG. 1 shows an X-ray computer tomograph with an X-ray detector formed according to an embodiment of the invention.

FIG. 1 shows an X-ray computer tomograph 1 with a patient supporting couch 2 with a patient 3 situated thereon for examination. The X-ray computer tomograph 1 has a gantry 4, the housing of which accommodates a tube-detector system mounted such that it can be rotated about a system axis 5. The tube-detector system includes an X-ray tube 6 and an X-ray detector 7 arranged opposite the latter. During operation X-ray radiation 8 emerges from the X-ray tube 6 in the direction of the X-ray detector 7 and can be detected by the latter. The X-ray detector 7 has a plurality of quantum detector modules 9. The X-ray detector 7 and the quantum detector modules 9 are respectively a directly converting, quantum counting detector and directly converting, quantum counting detector modules. The X-ray computer tomograph furthermore has a computer unit (not illustrated) that is designed for executing the method described in more detail further below.

Figure 2:
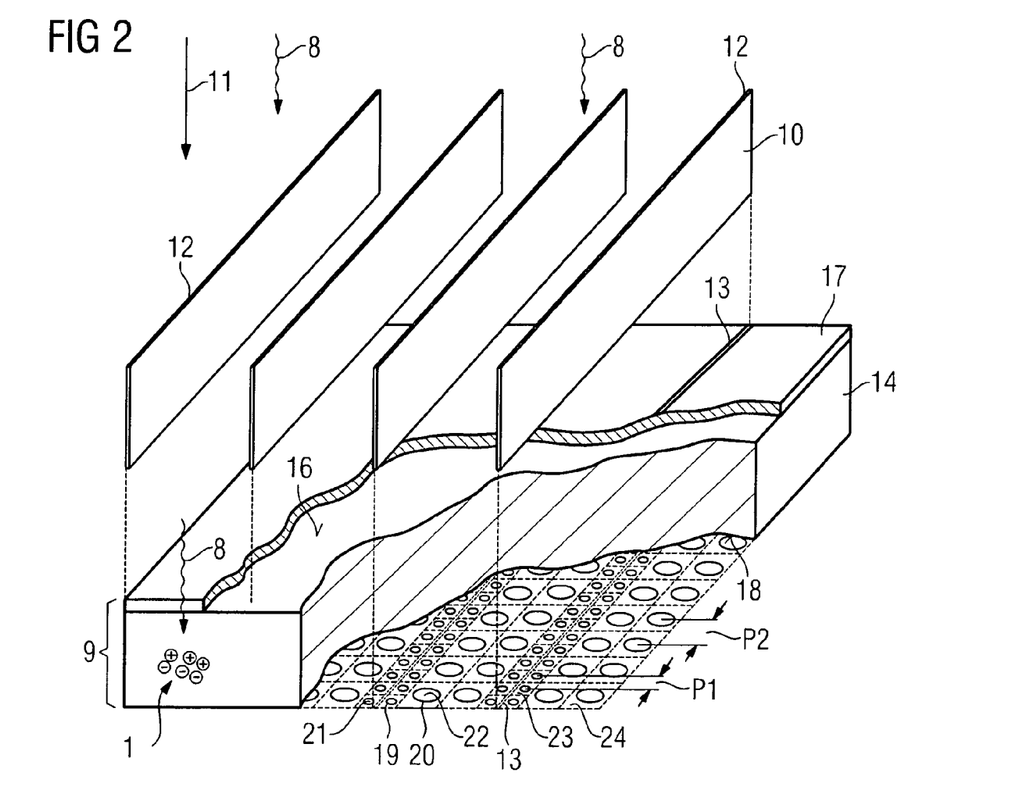
FIG. 2 shows a perspective exploded sectional illustration of a first configuration of a quantum detector module of the X-ray detector from FIG. 1.

A perspective exploded sectional illustration of the X-ray detector 7 is illustrated in FIG. 2. Collimator lamellae 10 for adsorbing scattered radiation caused by the interaction of the X-ray radiation 8 with the body of the patient 3 are arranged on the radiation entrance side. The collimator lamellae 10 also absorb X-ray radiation 8 impinging on longitudinal sides 12 of the collimator lamellae 10 parallel to a direction 11 of incidence of the X-ray radiation 8, as a result of which shading zones 13 are formed in the quantum detector modules 9.

The quantum detector module 9 has a converter layer 14, which is produced from a semiconductor material and serves for directly converting the X-ray radiation 8 into electrical charges 15, electrons and holes in the present case. A cover electrode 17, which is also known by designation "rear side contact", is applied on a first surface 16 of the converter layer 14. The cover electrode 17 is electrically conductively in contact with the first surface 16, that is to say that charge transfer can take place from the converter layer 14 to the cover electrode 17.

A multiplicity of first 19 and second individual electrodes 20, which are also known, inter alia, by the designation "pixel contact", are applied on a second surface 18 opposite the first surface 16. The first 19 and second individual electrodes 20 lie on the second surface 18 in discrete fashion, that is to say that they do not touch one another and there is no direct electrically conductive contact between them. The first 19 and second individual electrodes 20 have in each case a first 21 and, respectively, second electrode area 22 running parallel to the second surface 18. In this case, the first electrode area 21 is smaller than the second electrode area 22. The first 21 and second electrode areas 22 are formed in circular fashion. However, it is also possible for said electrode areas to have a different geometrical shape, e.g. polygonal, in particular rectangular, hexagonal, etc.

The first 19 and second individual electrodes 20 are arranged in parallel rows which in turn run parallel to the longitudinal direction of the collimator lamellae 10. The first 19 and second individual electrodes 20 are spaced apart at different distances from one another in the direction of the rows. The first individual electrodes 19 have a first spacing, that is to say first pitch P1, which is smaller than a second spacing, or second pitch P2, of the second individual electrodes 20. The first 19 and second individual electrodes 20 are respectively part of first 23 and second detector pixels 24, only a few of which are designated and illustrated in figures, for the sake of clarity. The respectively effectively active detection region, that is to say the respective pixel aperture, of the first 23 and second detector pixels 24 is dependent both on the respective electrode size and on the respective spacing. Owing to the different electrode sizes and spacings, the first 23 and second detector pixels 24 have different pixel apertures. In this case, the first detector pixels 23 have a smaller pixel aperture than the second detector pixels 24.

The second individual electrodes 20 are arranged in groups each of two parallel rows, with a shading zone 13 in each case lying between two adjacent groups. Each row of first individual electrodes 19 is arranged adjacent to a shading zone 13. The number of first 19 and second individual electrodes 20, the number of rows and the spacings and arrangement thereof can be chosen differently from the illustration in FIG. 2 depending on the requirements, e.g. the quantum flow rates of the X-ray radiation 8 that are to be expected locally, and should not in any way be regarded as restrictive for the invention. In this connection, attention is drawn to FIG. 5 and FIG. 6, which are discussed in more detail further below.

Figure 3:
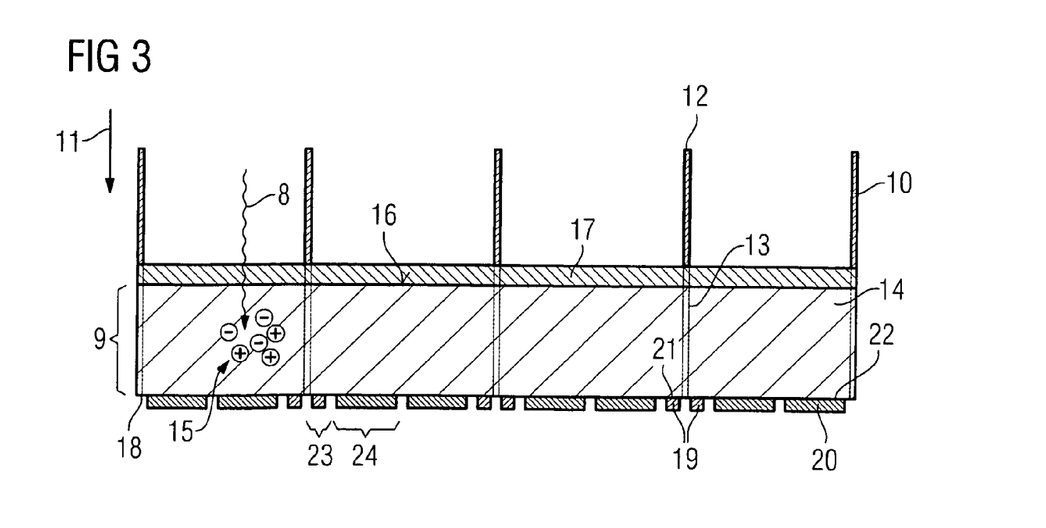
FIG. 3 shows a cross section of the quantum detector module of the first configuration.

FIG. 3 shows a cross section of the quantum detector module of the first configuration. As can be discerned in more detail from this, two rows of second individual electrodes 20 lie between two adjacent shading zones 13. A row of first individual electrodes 19 lies adjacent on both sides of each shading zone 13 situated on the inside with respect to the left-hand and right-hand edges of the converter layer 14 in FIG. 3. By way of the first individual electrodes 19, that region of the converter layer 14 which is adjacent to the shading zones 13 can advantageously be utilized even more effectively as active converter area.

Figure 4:
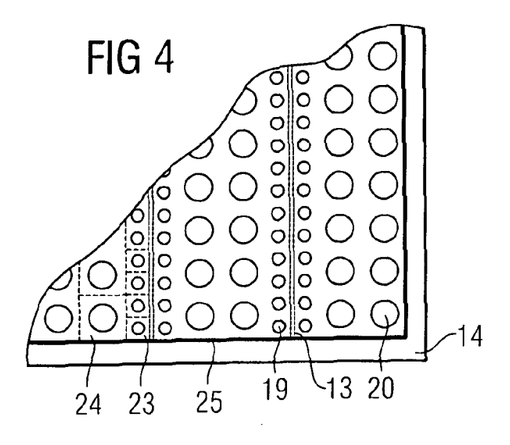
FIG. 4 shows a view of the quantum detector module from FIG. 2 from below.

No first individual electrodes 19 are provided adjacent to the shading zones 13 at the left-hand and right-hand edges of the converter layer 14. Instead, a circumferential electrode ring 25, which is only shown in FIG. 4 and which is also known by the designation "guard ring" and the function of which is described further below, can be provided along the edge of the converter layer 14 on the side of the second surface 18. To illustrate the geometrical arrangement of the first 19 and second individual electrodes 20, FIG. 4 shows a view—not explained any further—from below of the quantum detector module from FIG. 2.

The function of the quantum detector module 9 is as follows:

During operation of the quantum detector module 9, a voltage is applied between the cover electrode 17 and the first 19 and second individual electrodes 20. By way of the voltage, an electric field is generated in the converter layer. The guard ring serves to homogenize the electric field at the edge of the quantum detector module 9. As a result of absorption of a quantum of the X-ray radiation 8, that is to say a quantum absorption event, the electrical charges 15 are generated in the converter layer 14. By virtue of the electric field formed between the cover electrode 17 and a first 19 and second individual electrode 20, the charges 15 migrate in a manner dependent on the effective region of the electric field, in particular the effectively active detection region of the respective detector pixel, the type of charge and the polarity of the voltage, to the cover electrode 17 or to the first 19 or second individual electrodes 20, which can be detected in the form of electrical signals.

Given a sufficient time interval between the quantum absorption events which enables the associated electrical signals to be determined separately, the quantum absorption events can be quantitatively detected substantially exactly. At high quantum flow rates, the accuracy can be impaired by superpositions of the electrical signals, which is the case at the second individual electrodes 20 on account of the larger pixel aperture. In contrast to this, the quantum absorption events can be quantitatively determined more precisely by way of the first individual electrodes 19 on account of the smaller pixel aperture and associated higher temporal resolution.

The electrical charges 15 generated by a quantum absorption event are a measure of the energy of the associated quantum. If the charges 15 emerging from a quantum absorption event migrate to a plurality of first 19 or second individual electrodes 20, then the electrical signal does not represent the total energy of the quantum, which leads to an impairment of the energy resolution. The second individual electrodes 20 having a larger pixel aperture are affected to a lesser extent by this effect than the first individual electrodes 19 having a smaller pixel aperture. Thus, the second individual electrodes 20 exhibit a comparatively better energy resolution. The distribution of the electrical charges 15 of a quantum absorption event among a plurality of individual electrodes can be ascertained, if appropriate, by way of a temporal correlation of electrical signals such that a comparatively precise determination of the energy is nevertheless possible by combining the corresponding electrical signals. However, this last is much more difficult in the case of the smaller first individual electrodes 19 than in the case of the larger second individual electrodes 20. In this respect, the second individual electrodes 20 are more advantageous than the first individual electrodes 19 with regard to the energy resolution.

By utilizing the advantageous properties of the first 19 and second individual electrodes 20 afforded by the respective pixel apertures at high and low quantum flow rates, respectively, it is possible to increase the accuracy of the quantitative and energy-resolved determination of the quantum absorption events. For this purpose, the electrical signals of the first individual electrodes 19 can be used for correcting the electrical signals of the second individual electrodes 20 at high quantum flow rates.

Figure 5:
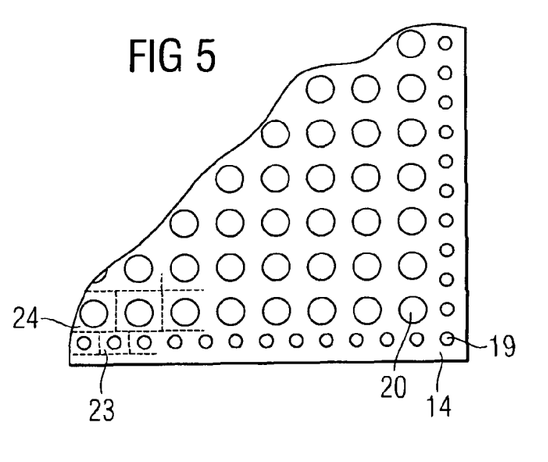
FIG. 5 shows a view corresponding to FIG. 4 of a second configuration of the quantum detector module.

FIG. 5 shows a view corresponding to FIG. 4 of a second configuration of the quantum detector module 9. In the quantum detector module of the second configuration, the first individual electrodes 19 are provided in place of the electrode ring 25 provided in the first configuration. As a result, firstly, as in the case where the electrode ring 25 is used, it is possible to achieve a homogenization of the electric field at the edge of the converter layer. Secondly, the electrical signals of the first individual electrodes 19, analogously to the first configuration, can be used for correcting the electrical signals of the second individual electrodes 20 at high quantum flow rates. It should be pointed out that in the illustration in FIG. 5, the first 19 and second individual electrodes 20 have different electrode sizes and spacings, and owing to this different pixel apertures.

Figure 6:
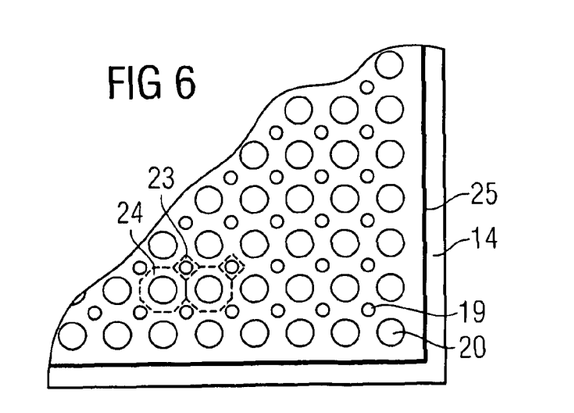
FIG. 6 shows a view corresponding to FIG. 4 of a third configuration of the quantum detector module.

A view corresponding to FIG. 4 of a third configuration of the quantum detector module 9 is shown in FIG. 6. In the third configuration, as in the first configuration and for the same purpose, an electrode ring 25 is provided. The first 19 and second individual electrodes 20 are arranged in rows parallel to the edges of the converter layer 14. In this case, the rows of the first 19 and second individual electrodes 20 are arranged offset with respect to one another, wherein the first 19 and second individual electrodes 20 are arranged interstitially with respect to one another. Although the first pitch P1 and second pitch P2 are identical, the first 19 and second individual electrodes 20 have different electrode areas, such that here, too, the pixel aperture of the first individual electrodes 19 is smaller than that of the second individual electrodes 20.

In the third configuration, the electrical signals of the first individual electrodes 19, analogously to the first and second configurations, can be used for correcting the electrical signals of the second individual electrodes 20. By virtue of the first 19 and second individual electrodes 20 being distributed uniformly over the second surface 18, the electrical signals of at least two adjacent first 19 and second individual electrodes 20 can be combined to form an overall electrical signal, whereby a particularly precise quantitative and energy-resolved detection of quantum absorption events can be achieved. The combination can be effected e.g. in the form of a weighted summation of the electrical signals of adjacent first 19 and second individual electrodes 20, which will be discussed again below in connection with the description of a method for the quantitative and energy-resolved determination of quantum absorption events.

Figure 7:
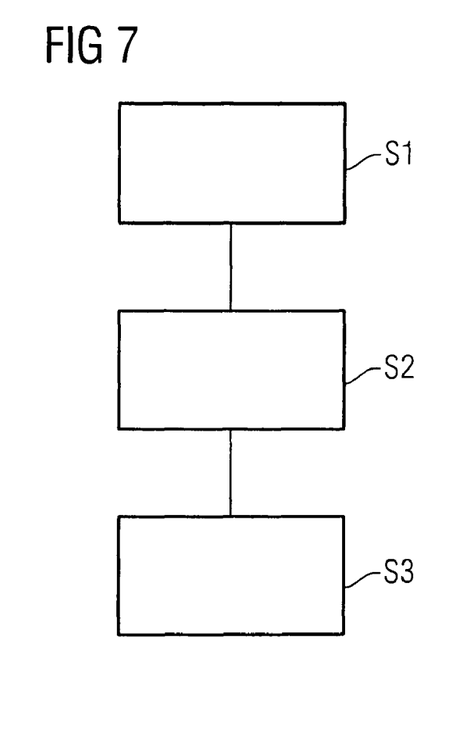
FIG. 7 shows a flowchart of a method for the quantitative and energy-resolved determination of quantum absorption events.

FIG. 7 shows a flowchart of a method for the quantitative and energy-resolved determination of quantum absorption events. Electrical signals of an X-ray detector according to the invention are used in the method. Electrical signals of the first 19 and second individual electrodes 20 are detected in a first step S1. In a second step S2, from electrical signals of at least two adjacent first 19 and second individual electrodes 20 having different pixel apertures, an overall signal is calculated by weighted summation of the electrical signals of the first 19 and second individual electrode(s) 20. A counter quantity is determined from the overall signal, the counter quantity including a count and energy value for quantum absorption events or a quantum absorption event, wherein in the latter case the counter corresponds to the number one.

In a third step S3, on the basis of the overall signal, a counter for quanta having an energy corresponding to the energy value or quanta in an energy interval corresponding to the energy value is increased in accordance with the count. In this case, the value of the counter represents the quanta absorbed in the converter layer 14 in a time window, e.g. the duration of an X-ray recording, and having the corresponding energy or the absorbed quanta in the corresponding energy interval. On the basis of the value of the counter and the corresponding energy or the corresponding energy interval, it is possible to determine an image representation of a section of the patient's body that is scanned by way of the X-ray radiation 8.

Figure 8:
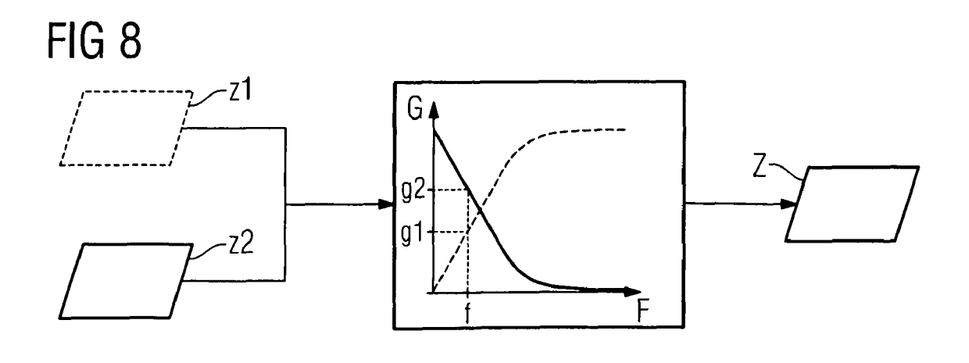
FIG. 8 shows an explanatory illustration for the determination of weighting factors in the method according to FIG. 7.

FIG. 8 shows an explanatory illustration for determining weighting factors G for the weighted summation of the method according to FIG. 7. On the basis of first electrical signals z1 of the first individual electrodes 19 and second electrical signals z2 of the second individual electrodes 20 and/or respective values of the counters, a quantum flow rate f is determined or estimated for the respective X-ray radiation 8. Respective first g1 and second weighting factors g2 are determined depending on the quantum flow rate f.

In the diagram shown in FIG. 8, weighting factors G are plotted against the quantum flow rate F without concrete values and units being indicated. The dependence of the first weighting factors g1 on the quantum flow rate F is given by the dashed curve and that of the second weighting factors g2 is given by the solid curve. The curves can be determined e.g. on the basis of test measurements taking account of the properties of the first 19 and second individual electrodes 20, of the respective examination object, etc. Since the second individual electrodes 20 exhibit a comparatively good energy resolution at low quantum flow rates F, the second weighting factors g2 are comparatively high at low quantum flow rates F and decrease as quantum flow rates F increase. Since the first individual electrodes 19 are particularly well suited to comparatively high quantum flow rates F, the first weighting factors g1 are small at low quantum flow rates F and increase as the quantum flow rate F increases.

The first g1 and second weighting factors g2 result, in accordance with the dotted lines, from the respectively determined or estimated quantum flow rate f of the X-ray radiation 8.

After the first g1 and second weighting factors g2 have been determined, with the first z1 and second electrical signals z2 it is possible to determine an overall electrical signal Z by weighted summation, e.g. as follows: $Z=g1*z1+g2*z2$. Since the overall electrical signal Z is determined using the detection properties of the first 19 and second individual electrodes 20 that are advantageous for the respective pixel aperture, a particularly precise quantitative and energy-resolved determination of the quantum absorption events can be achieved.

Embodiments of the invention have been described on the basis of a quantum detector module having two mutually different pixel apertures. However, it is also possible for a plurality of mutually different pixel apertures to be used. Furthermore, the pixel apertures can be adapted to quantum flow rates F that are to be expected locally. For this purpose, the individual electrodes of a quantum detector module can have locally different electrode sizes and/or pitch. In an X-ray detector, an adaption to the quantum flow rate F to be expected can be effected e.g. by varying the electrode size and/or pitch in a manner dependent on the mounting position of the quantum detector modules in the quantum detector.

It is also possible for the number, density, etc. of the individual electrodes to be chosen in a manner dependent on the quantum flow rates F to be expected. Furthermore, it is possible for the number of detector pixels having different pixel apertures to be chosen in a manner dependent on the quantum flow rates F to be expected. Moreover, the area density of the individual electrodes can be chosen in a manner dependent on the quantum flow rates F to be expected. The abovementioned variations show that a multiplicity of different quantum detector modules or quantum detectors having different pixel apertures that are optimally adapted in each case are possible with regard to the geometry of the arrangement of the individual electrodes and the number thereof. In this respect, the configurations described with reference to the figures should be understood, by way of example and represent only an exemplary, non-exhaustive selection of the possible forms of realization.

Overall it becomes clear that embodiments of the invention enable a particularly precise quantitative and energy-resolved determination of quantum absorption events.

Further, elements and/or features of different example embodiments may be combined with each other and/or substituted for each other within the scope of this disclosure and appended claims.

Still further, any one of the above-described and other example features of the present invention may be embodied in the form of an apparatus, method, system, computer program and computer program product. For example, of the aforementioned methods may be embodied in the form of a system or device, including, but not limited to, any of the structure for performing the methodology illustrated in the drawings.

Even further, any of the aforementioned methods may be embodied in the form of a program. The program may be stored on a computer readable media and is adapted to perform any one of the aforementioned methods when run on a computer device (a device including a processor). Thus, the storage medium or computer readable medium, is adapted to store information and is adapted to interact with a data processing facility or computer device to perform the method of any of the above mentioned embodiments.

The storage medium may be a built-in medium installed inside a computer device main body or a removable medium arranged so that it can be separated from the computer device main body. Examples of the built-in medium include, but are not limited to, rewriteable non-volatile memories, such as ROMs and flash memories, and hard disks. Examples of the removable medium include, but are not limited to, optical storage media such as CD-ROMs and DVDs; magneto-optical storage media, such as MOs; magnetism storage media, including but not limited to floppy disks (trademark), cassette tapes, and removable hard disks; media with a built-in rewriteable non-volatile memory, including but not limited to memory cards; and media with a built-in ROM, including but not limited to ROM cassettes; etc. Furthermore, various information regarding stored images, for example, property information, may be stored in any other form, or it may be provided in other ways.

Example embodiments being thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A quantum detector module for quantitative and energy-resolved determination of quantum absorption events caused by quanta of at least one of X-ray and gamma radiation incident on the quantum detector module, the quantum detector module comprising:
   a multiplicity of detector pixels, including at least two mutually different pixel apertures, to convert the quantum absorption events into electrical charges; and
   a converter layer, on which a cover electrode is applied on a first surface and, a multiplicity of discretely situated individual electrodes on a second surface opposite the first surface, the multiplicity of discretely situated individual electrodes each including an electrode area running parallel to the second surface, wherein
   at least one of electrode sizes and spacings of the individual electrodes are chosen such that at least two mutually different pixel apertures are formed.

2. The quantum detector module as claimed in claim 1, wherein the pixel apertures assume precisely two mutually different values.

3. The quantum detector module as claimed in claim 1, wherein the number of detector pixels having an identical pixel aperture is chosen in a manner dependent on the quantum absorption events to be expected.

4. The quantum detector module as claimed in claim 1, wherein the number of mutually different pixel apertures is chosen in a manner dependent on the quantum absorption events to be expected.

5. The quantum detector module as claimed in claim 1, wherein the detector pixels are arranged in rows, and wherein the pixel aperture of a first detector pixel group including at least one row is relatively larger or smaller than that of an adjacent second detector pixel group including at least one row.

6. The quantum detector module as claimed in claim 1, wherein the detector pixels of a detector pixel group have the same pixel aperture.

7. The quantum detector module as claimed in claim 1, wherein the pixel aperture of adjacent detector pixel groups varies periodically.

8. The quantum detector module as claimed in claim 1, wherein each detector pixel group consists of precisely one or of two rows.

9. The quantum detector module as claimed in claim 5, wherein there are arranged along an edge of the quantum detector module detector pixels whose pixel aperture is smaller than that of the detector pixels situated more centrally with respect to the edge.

10. A quantum detector, comprising at least one quantum detector module as claimed in claim 1.

11. The quantum detector as claimed in claim 10, wherein the average pixel aperture of the at least one quantum detector module increases proceeding from at least one edge of the quantum detector toward the center thereof.

12. The quantum detector as claimed in claim 11, further comprising:
   a scattered radiation collimator disposed upstream of the at least one quantum detector module on a radiation entrance side, wherein, in regions adjacent to shading zones caused by the scattered radiation collimator, the pixel aperture is on average relatively smaller than outside said regions.

13. The quantum detector as claimed in claim 10, further comprising:
   a scattered radiation collimator disposed upstream of the at least one quantum detector module on a radiation entrance side, wherein
   in regions adjacent to shading zones caused by the scattered radiation collimator, the pixel aperture is on average relatively smaller than outside said regions.

14. A method for the quantitative and energy-resolved determination of quantum absorption events caused by quanta of at least one of an X-ray and gamma radiation incident on a quantum detector as claimed in claim 10, the method comprising:
   detecting electrical signals on the basis of the generated electrical charges by way of the detector pixels; and
   determining quantitative, energy-resolved counter quantities including at least one count and one energy value for a quantum absorption event, by combination of at least two detected electrical signals from at least two detector pixels having different pixel apertures.

15. The method as claimed in claim 14, wherein a counter for the energy value is increased in accordance with the count after the determining.

16. The method as claimed in claim 15, wherein the combination is carried out by way of a weighted summation of the corresponding electrical signals.

17. The method as claimed in claim 16, wherein weighting factors for the weighted summation are determined on the basis of the electrical signals.

18. The method as claimed in claim 14, wherein the combination is carried out by way of a weighted summation of the corresponding electrical signals.

19. The method as claimed in claim 18, wherein weighting factors for the weighted summation are determined on the basis of the electrical signals.

20. A computer program product, comprising a program code which, when executed on a computer unit, effects a method as claimed in claim 14.

21. The method of claim 14, wherein the determining includes determining of quantitative, energy-resolved counter quantities including at least one count and one energy value for a quantum absorption event, by combination of at least two detected electrical signals from at least two adjacent detector pixels having different pixel apertures.

22. The quantum detector module as claimed in claim 1, wherein the pixel apertures assume precisely two mutually different values.

23. A radiation detection device, comprising:
   a quantum detector including a quantum detector module for quantitative and energy-resolved determination of quantum absorption events caused by quanta of at least one of X-ray and gamma radiation incident on the quantum detector module, the quantum detector module including,
   a multiplicity of detector pixels, including at least two mutually different pixel apertures, to convert the quantum absorption events into electrical charges
   a computer unit with a program code stored therein, the execution of which program code on the computer unit is adapted to effect detecting electrical signals on the basis of the generated electrical charges by way of the detector pixels and determining quantitative, energy-resolved counter quantities including at least one count and one energy value for a quantum absorption event, by combination of at least two detected electrical signals from at least two detector pixels having different pixel apertures; and a converter layer, on which a cover electrode is applied on a first surface and, a multiplicity of discretely situated individual electrodes on a second surface opposite the first surface, the multiplicity of discretely situated individual electrodes each including an electrode area running parallel to the second surface, wherein at least one of electrode sizes and spacings of the individual electrodes are chosen such that at least two mutually different pixel apertures are formed.

24. A radiation detection device, comprising:

a quantum detector including a quantum detector module for quantitative and energy-resolved determination of quantum absorption events caused by quanta of at least one of X-ray and gamma radiation incident on the quantum detector module, the quantum detector module including, a multiplicity of detector pixels, including at least two mutually different pixel apertures, to convert the quantum absorption events into electrical charges;

means for detecting electrical signals on the basis of the generated electrical charges by way of the detector pixels; and means for determining quantitative, energy-resolved counter quantities including at least one count and one energy value for a quantum absorption event, by combination of at least two detected electrical signals from at least two detector pixels having different pixel apertures; and means for applying a cover electrode on a first surface and, a multiplicity of discretely situated individual electrodes on a second surface opposite the first surface, the multiplicity of discretely situated individual electrodes each including an electrode area running parallel to the second surface, wherein at least one of electrode sizes and spacings of the individual electrodes are chosen such that at least two mutually different pixel apertures are formed.

* * * * *